(12) United States Patent     (10) Patent No.:   US 12,618,473 B2
Watanabe     (45) Date of Patent:     May 5, 2026

(54) SEALING RING AND SEALED STRUCTURE INCLUDING SAME

(71) Applicant: NOK CORPORATION, Tokyo (JP)

(72) Inventor: Hideya Watanabe, Kitaibaraki (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/572,083

(22) PCT Filed: Apr. 8, 2022

(86) PCT No.: PCT/JP2022/017399
§ 371 (c)(1),
(2) Date: Dec. 19, 2023

(87) PCT Pub. No.: WO2022/270127
PCT Pub. Date: Dec. 29, 2022

(65) Prior Publication Data
US 2024/0288074 A1     Aug. 29, 2024

(30) Foreign Application Priority Data
Jun. 22, 2021    (JP) .................................. 2021-102898

(51) Int. Cl.
*F16J 15/32*     (2016.01)
(52) U.S. Cl.
CPC ..................................... *F16J 15/32* (2013.01)
(58) Field of Classification Search
CPC ......... F16J 15/32; F16J 15/3268; F16J 15/44; F16J 15/441; F16J 15/18; F16J 15/442; F16J 15/444
See application file for complete search history.

(56) References Cited

U.S. PATENT DOCUMENTS

| | | | | |
|---|---|---|---|---|
| 1,187,212 A | * | 6/1916 | Westinghouse | ........ F16J 15/441 |
| | | | | 277/413 |
| 7,066,470 B2 | * | 6/2006 | Turnquist | .............. F04D 29/102 |
| | | | | 277/355 |

(Continued)

FOREIGN PATENT DOCUMENTS

| | | |
|---|---|---|
| EP | 1927797 A1 | 6/2008 |
| EP | 4163522 A1 | 4/2023 |

(Continued)

OTHER PUBLICATIONS

Office Action issued in corresponding Japanese Patent Application No. 2023-529636 dated Mar. 26, 2024, with English translation (4 Pages).

(Continued)

*Primary Examiner* — Christine M Mills
*Assistant Examiner* — Lakshmi Susmitha Koneru
(74) *Attorney, Agent, or Firm* — Harness, Dickey & Pierce, P.L.C.

(57) ABSTRACT

A sealed structure includes: a shaft; a member having a hole for the shaft; and a sealing ring sealing a gap between the shaft and the member. The shaft has a circular ring groove centered around the central axis of the shaft. The bottom surface of the groove has a recess. The sealing ring has a protrusion protruding toward the central axis. The protrusion fits into the recess. When the shaft rotates, an end face X of the protrusion and an end face Y of the recess contact each other to push the sealing ring radially outward. An angle α of a straight line representing the end face X relative to the radial direction of the sealing ring and an angle δ of a straight line representing the end face Y relative to the radial direction of the shaft are both at least 45 degrees.

6 Claims, 11 Drawing Sheets

(56)  References Cited

U.S. PATENT DOCUMENTS

| | | | |
|---|---|---|---|
| 9,726,292 B2 | 8/2017 | Stirnemann et al. | |
| D875,899 S * | 2/2020 | Yoshida | D23/269 |
| 2004/0100035 A1* | 5/2004 | Turnquist | F16J 15/445 |
| | | | 277/412 |
| 2015/0003970 A1* | 1/2015 | Feldmann | F01D 9/02 |
| | | | 415/173.1 |
| 2015/0362074 A1* | 12/2015 | Seki | F16J 15/441 |
| | | | 277/512 |
| 2021/0140545 A1 | 5/2021 | Yoshida et al. | |
| 2021/0222577 A1* | 7/2021 | Ozaki | F01D 5/225 |
| 2022/0243819 A1* | 8/2022 | Watanabe | F16J 15/3272 |
| 2023/0272858 A1* | 8/2023 | Hatano | F16J 15/3272 |
| | | | 277/572 |
| 2024/0263703 A1* | 8/2024 | Watanabe | F16J 15/3448 |

FOREIGN PATENT DOCUMENTS

| | | | |
|---|---|---|---|
| JP | H0463864 U | 5/1992 | |
| JP | 2007292296 A | 11/2007 | |
| JP | 2015218791 A | 12/2015 | |
| JP | 2016014481 A | 1/2016 | |
| JP | 3230072 U | 1/2021 | |
| JP | 2022-058162 A | 4/2022 | |
| WO | 2019004268 A1 | 1/2019 | |
| WO | 2021251319 A1 | 12/2021 | |

OTHER PUBLICATIONS

International Search Report and Written Opinion of the International Searching Authority issued in PCT/JP2022/017399, mailed on May 17, 2022; ISA/JP (13 pages).
Extended European Search Report for corresponding European Patent Application No. 22828046.7 dated Apr. 11, 2025 (11 Pages).
Anonymous, "Tabbed Seal", Research Disclosure, Kenneth Mason Publications, Hampshire, UK, GB, vol. 391, No. 3, Nov. 1, 1996, 1 Page.

* cited by examiner

[FIG 1]
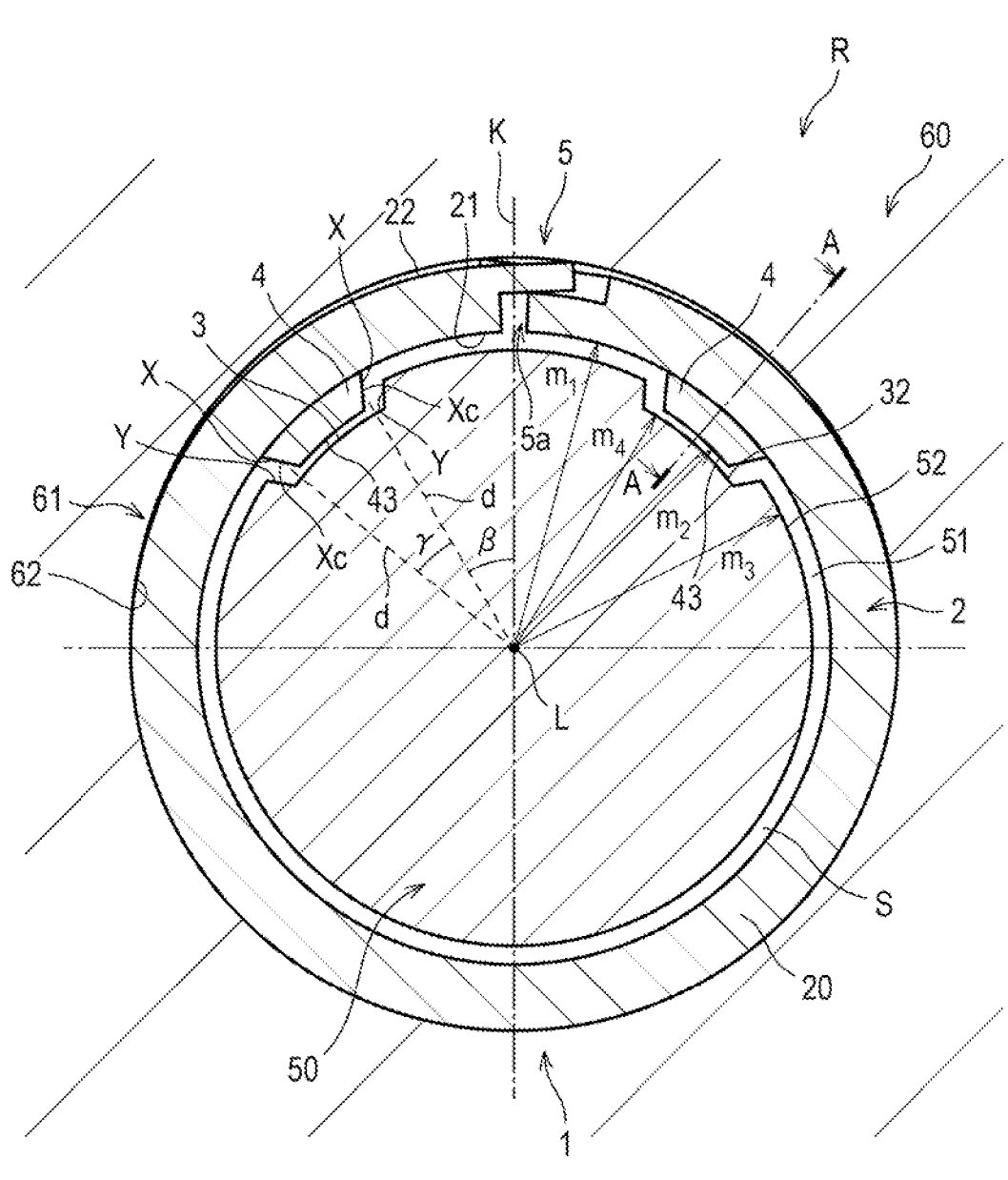

[FIG 2]
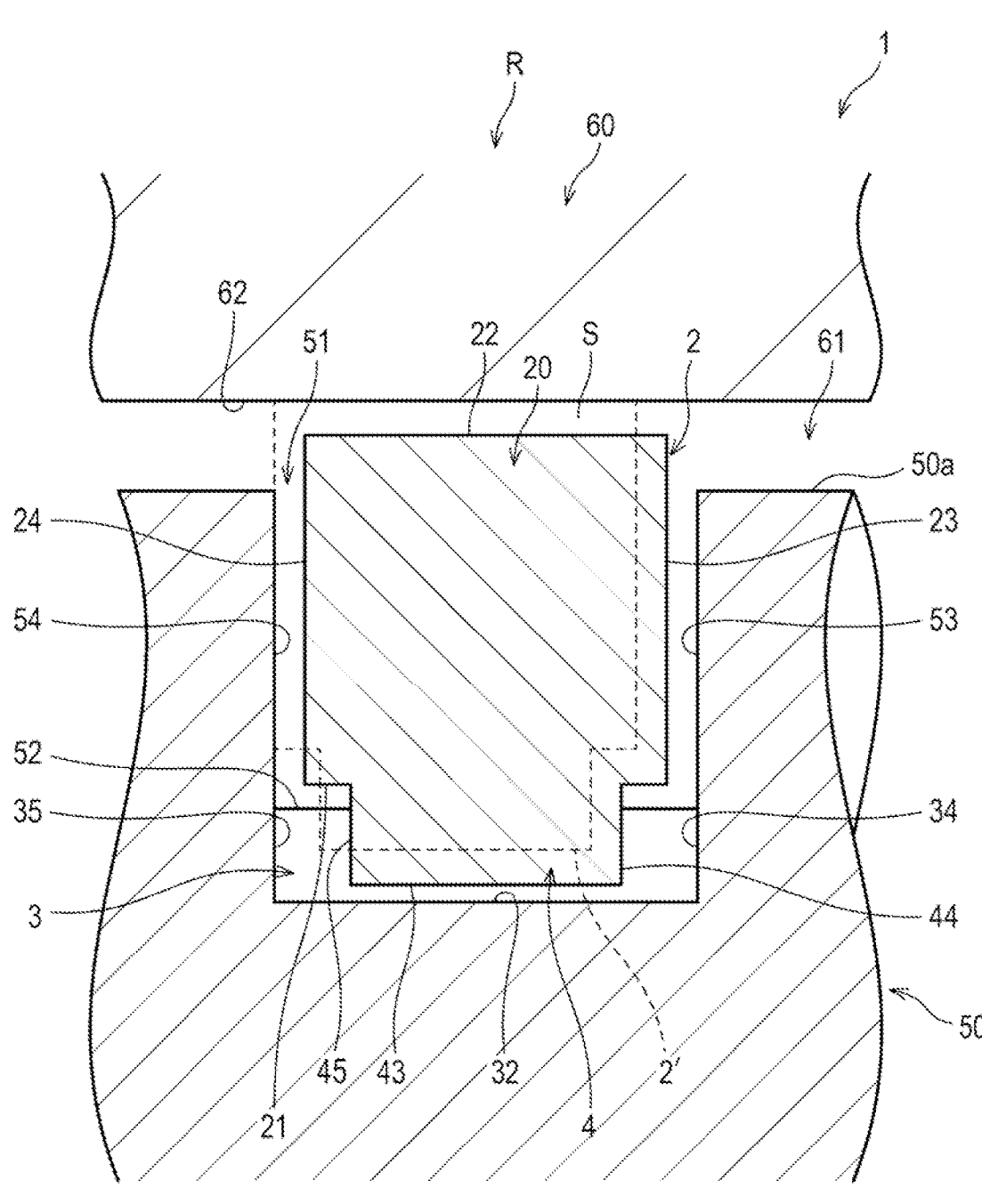

[FIG 3]
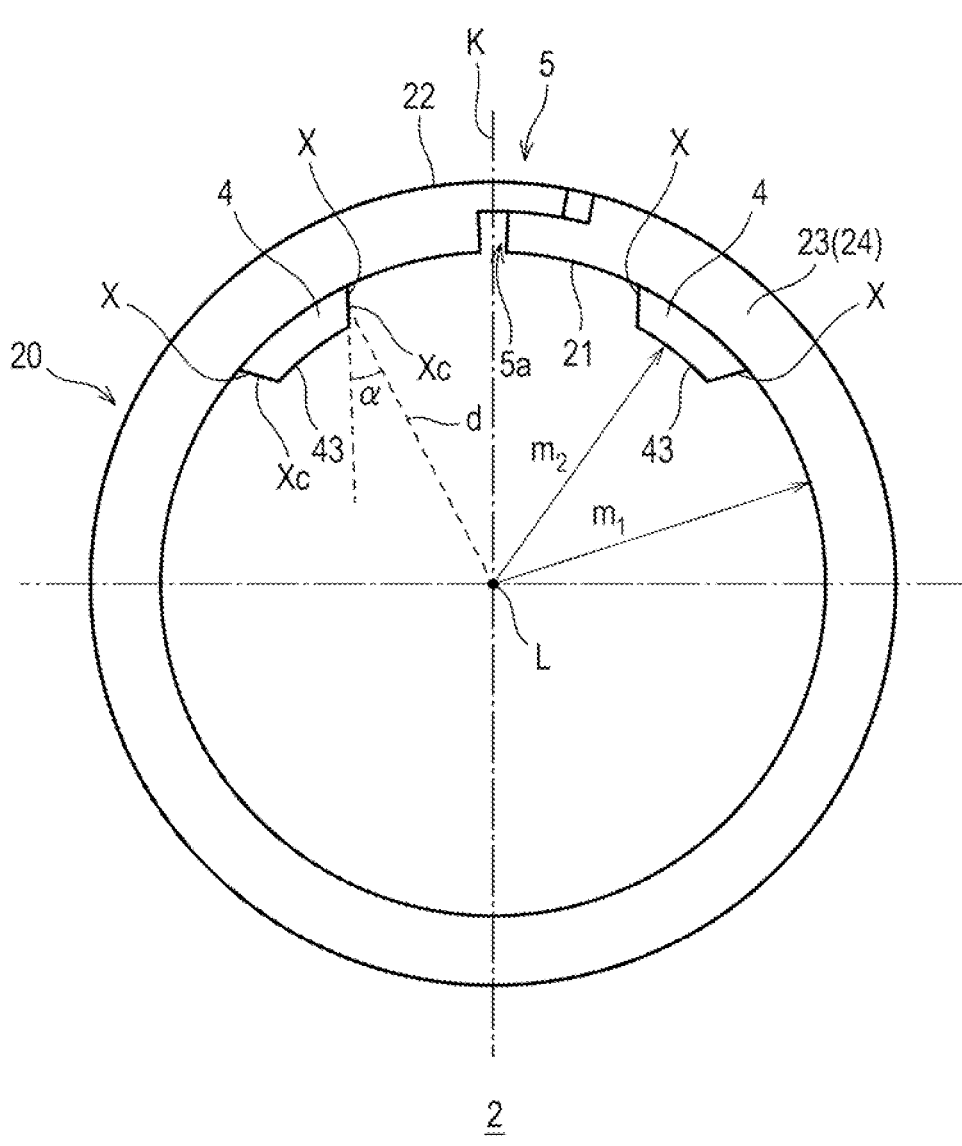
<u>2</u>

[FIG 4]
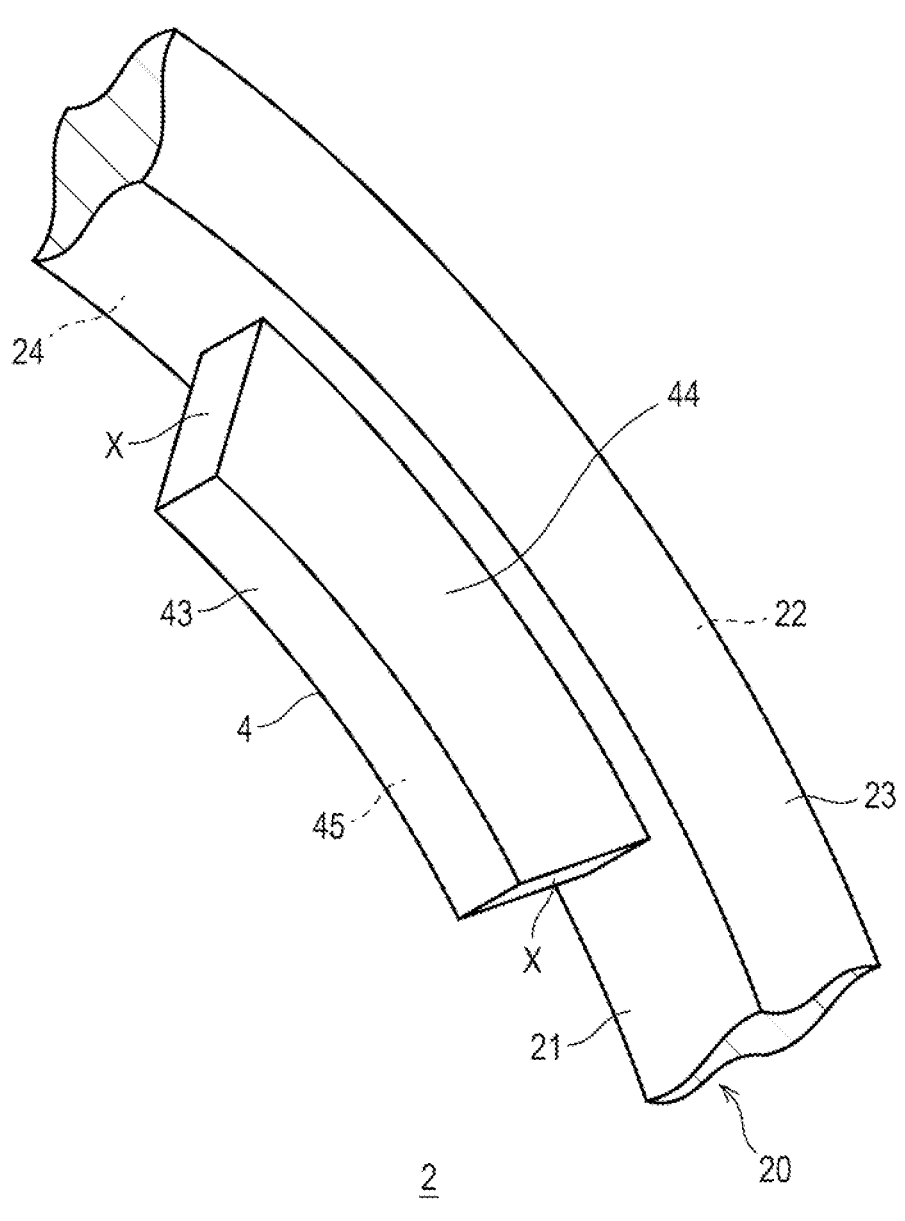
2

[FIG 5]
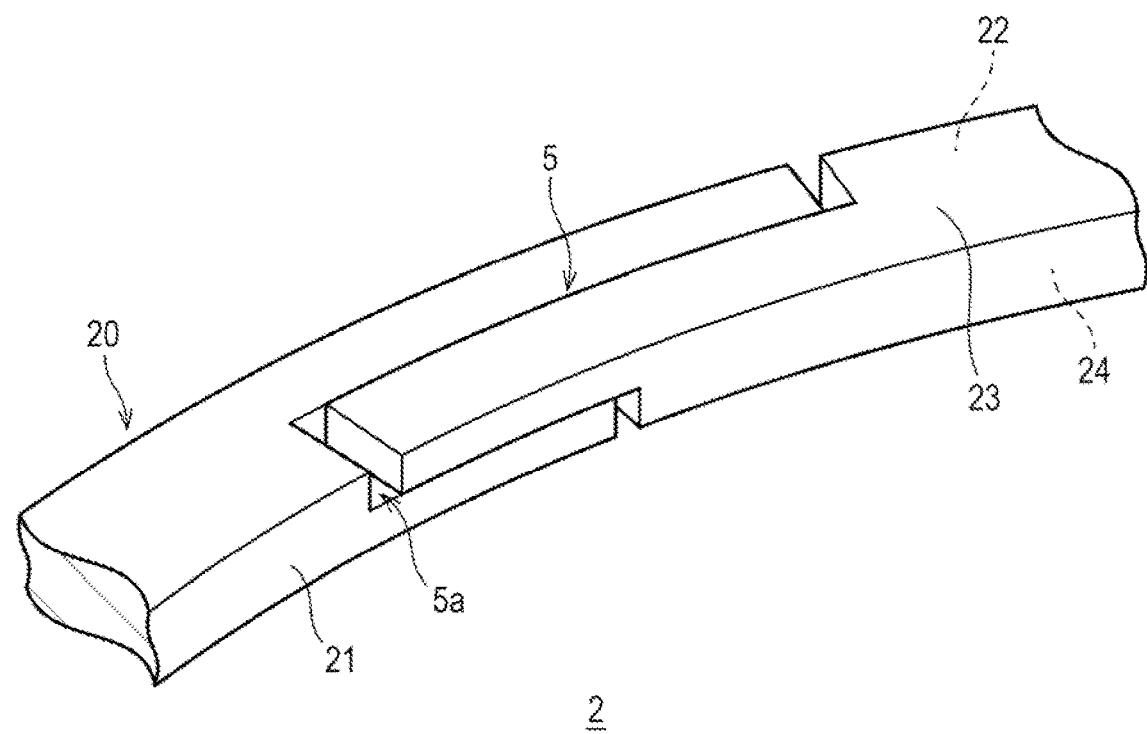

[FIG 6]
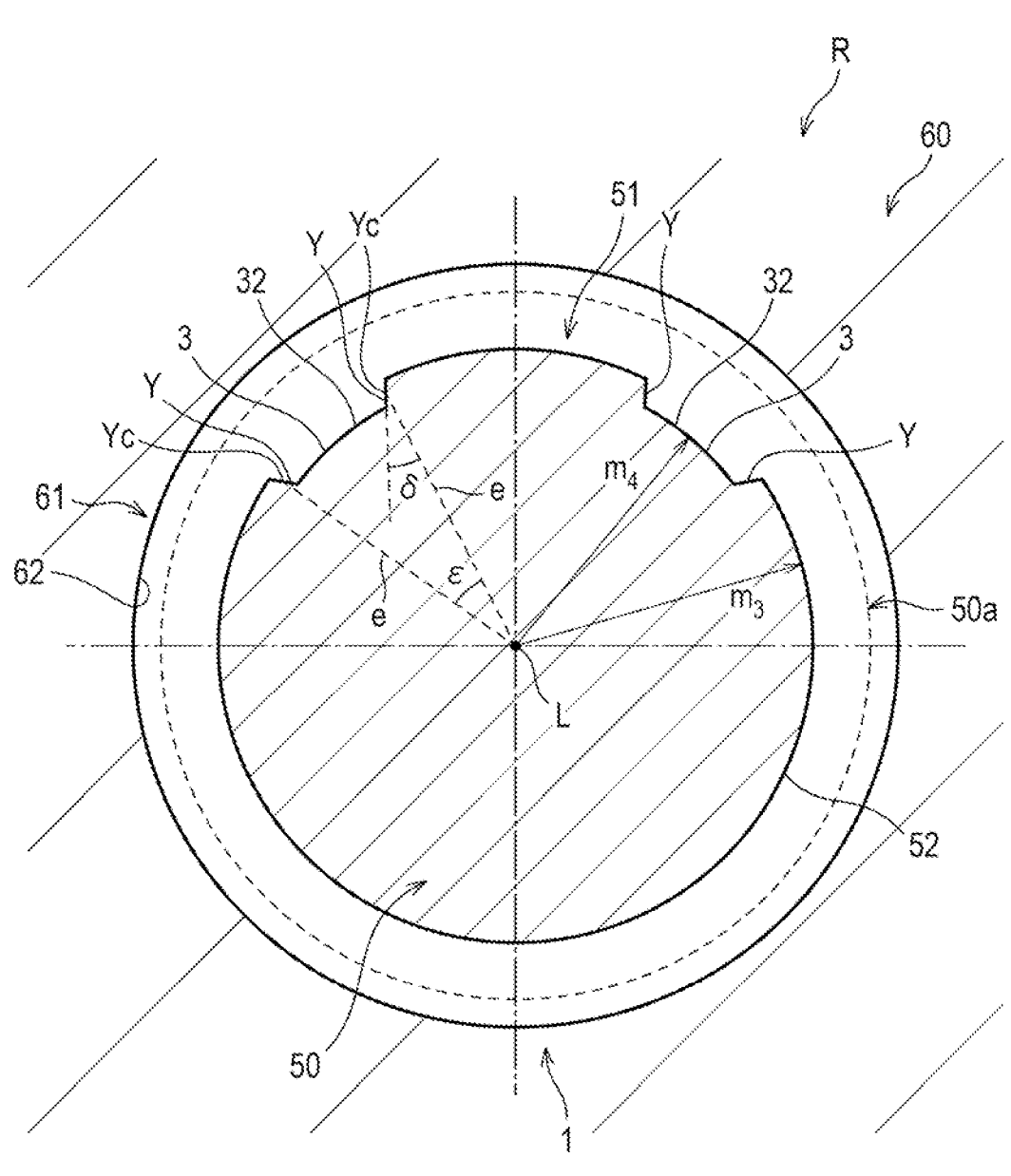

[FIG 7]
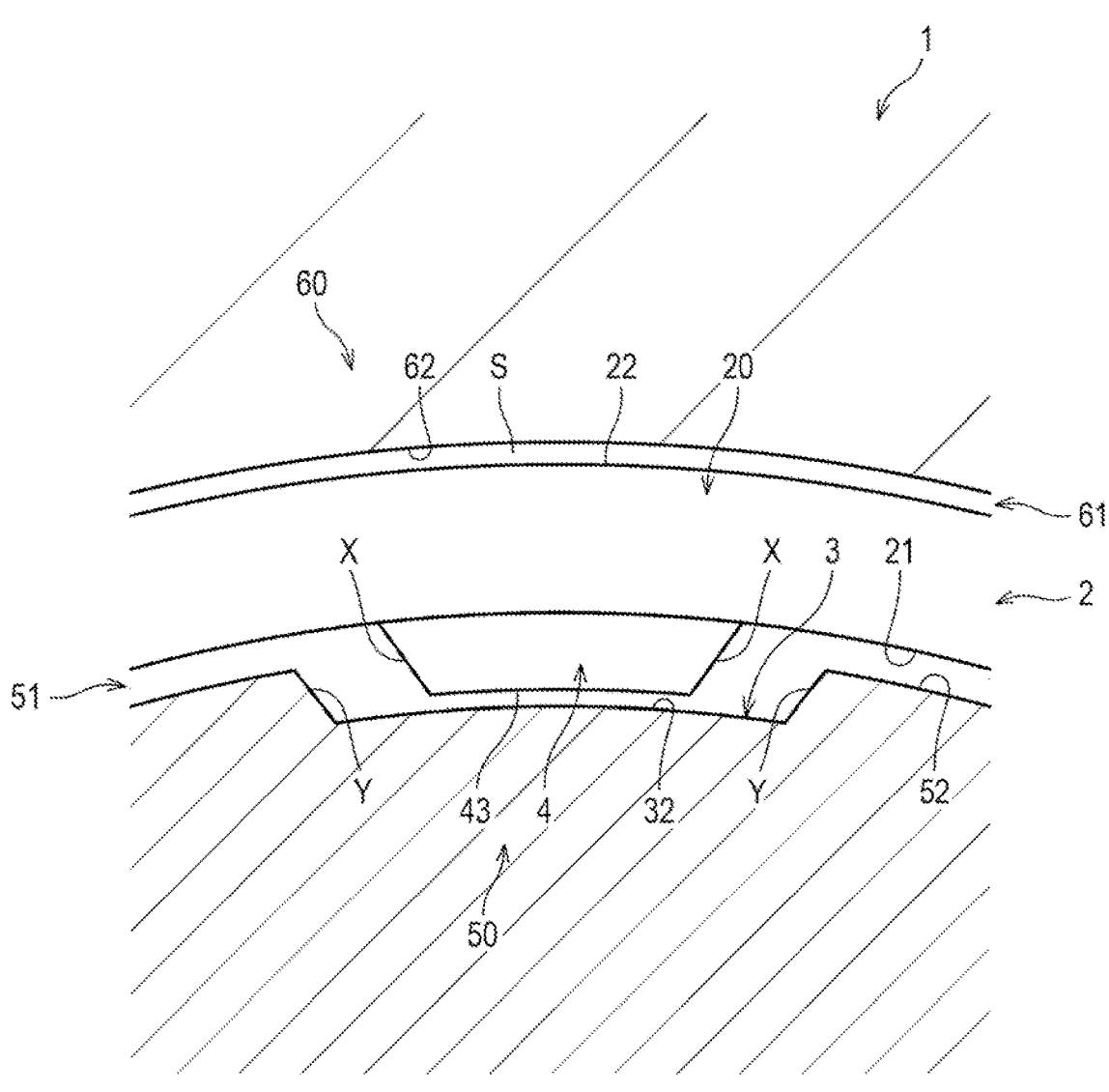

[FIG 8]
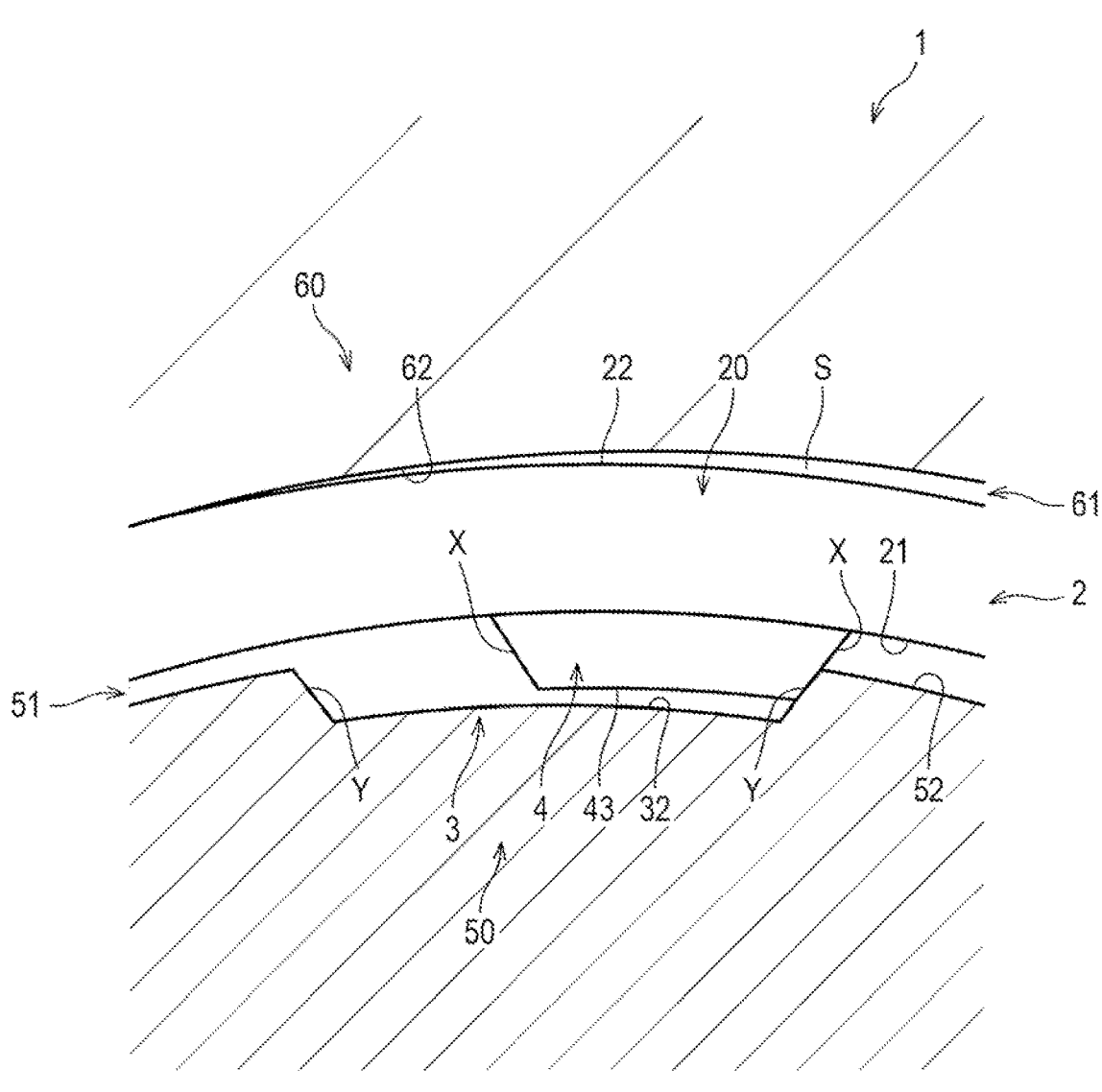

[FIG 9]
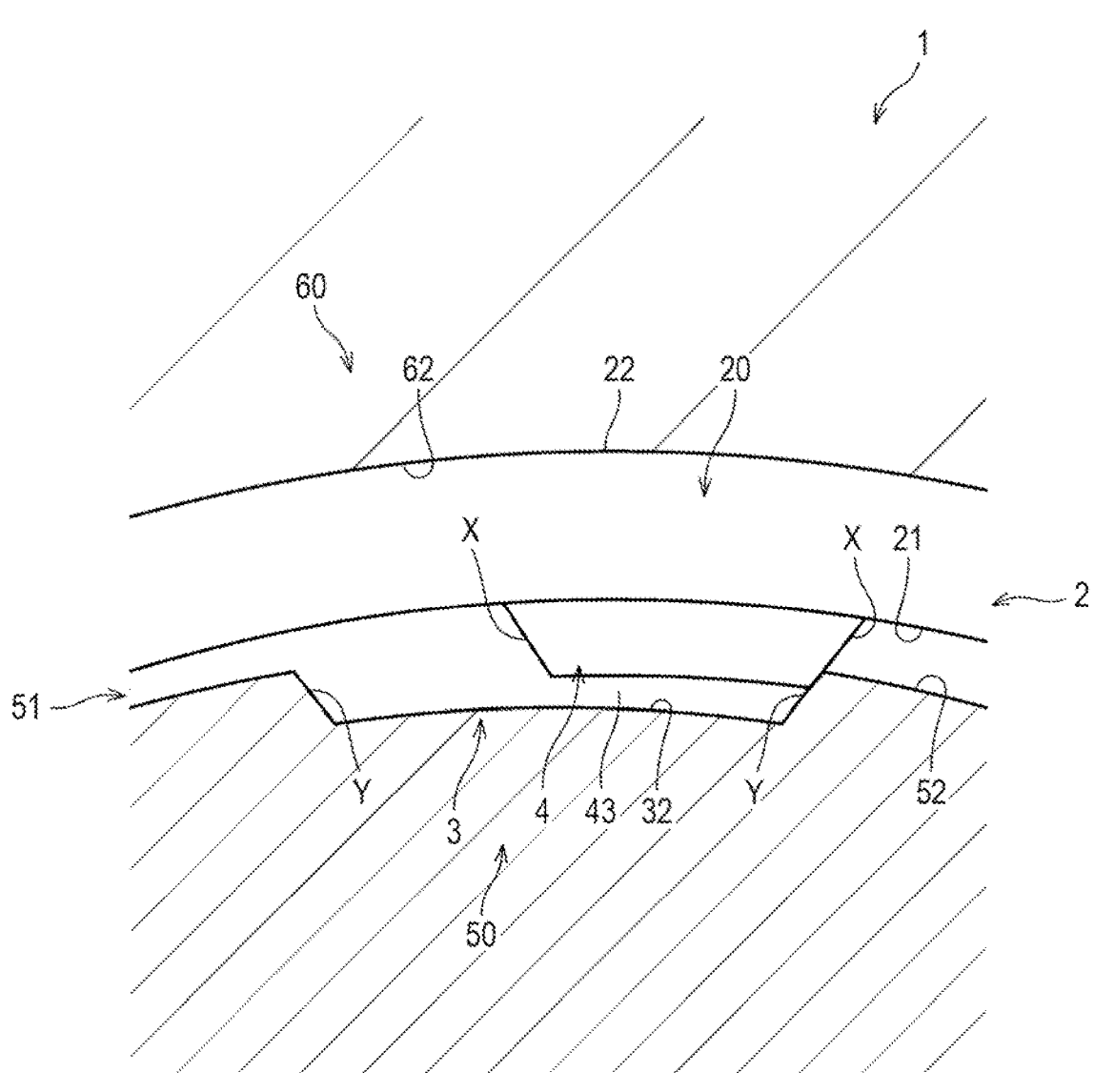

[FIG 10]
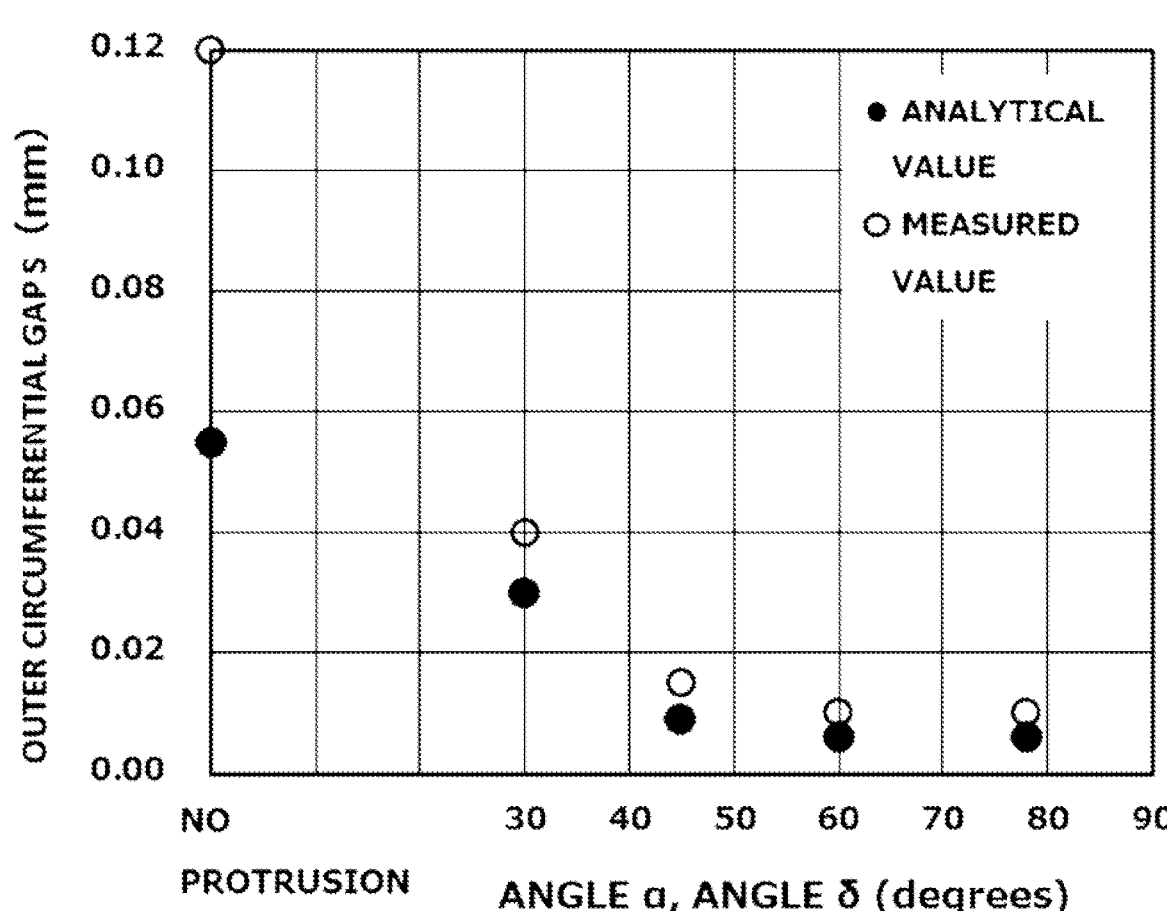

[FIG 11]
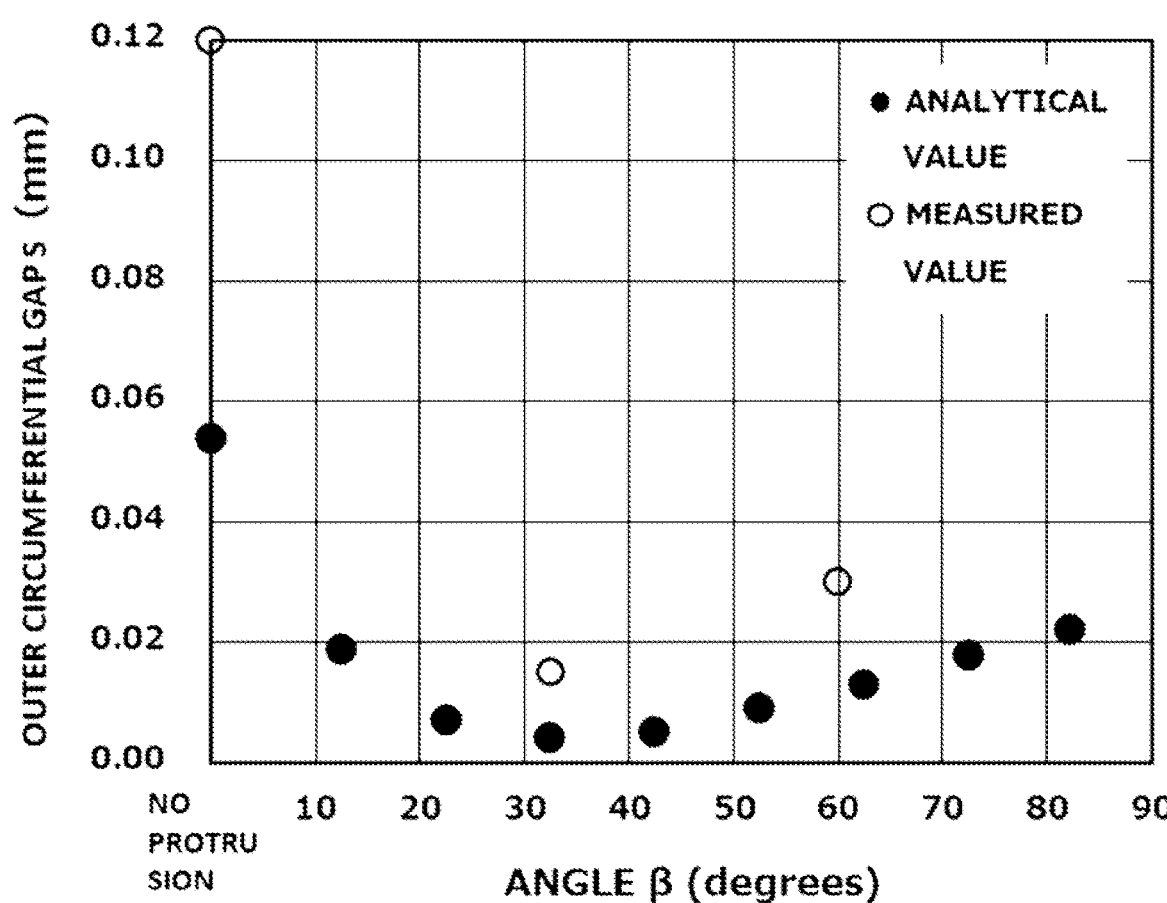

SEALING RING AND SEALED STRUCTURE INCLUDING SAME

CROSS REFERENCE TO RELATED APPLICATIONS

This application is a 371 U.S. National Phase of International Application No. PCT/JP2022/017399, filed on Apr. 8, 2022, which claims priority to Japanese Patent Application No. 2021-102898, filed Jun. 22, 2021. The entire disclosures of the above applications are incorporated herein by reference.

BACKGROUND

Technical Field

The present invention relates to a sealing ring and a sealed structure including the same.

Related Art

For example, in a reducer of a motor mechanism in an electric vehicle (EV), a hybrid electric vehicle (HEV) or the like, a sealed structure is used to prevent leakage of cooling oil within the reducer.

Such a sealed structure has a sealing ring in it and the sealing ring is used to seal a gap between a shaft and a shaft hole in which the shaft is to be inserted. The sealing ring is accommodated within a groove formed at the outer circumferential surface of the shaft and seals the gap between the shaft and the shaft hole by contact with the inner surface of a member constituting the shaft hole, thereby preventing an object to be sealed (for example, cooling oil within the reducer) from leaking out of the shaft hole while retaining the hydraulic pressure of the cooling oil or the like in the gap between the shaft and the shaft hole.

The sealing ring is usually not endless but is cut and has an abutment portion at the cut part (see, for example, JP 2016-14481 A).

The hydraulic pressure of the cooling oil in the reducer of the motor mechanism in the electric vehicle (EV) or the hybrid electric vehicle (HEV) is very low or zero. That is, the hydraulic pressure applied to the sealing ring is significantly lower than the pressure (hydraulic pressure) applied to a sealing ring used to seal the operating oil in an automatic transmission (AT), a continuously variable transmission (CVT) or the like.

The sealing ring used in such a low pressure environment as in a reducer or the like is usually formed using a resin material by a method such as injection molding. In a case where molding is made by, for example, the injection molding, the sealing ring is formed in a state in which the abutment portion is wide, and the molding is followed by correction (diameter reduction) to obtain a desired diameter. However, it is hard to correct the abutment portion and its vicinity. Particularly in a case where rigid resins such as PEEK (polyetheretherketone) and PPS (polyphenylene sulfide) are used as resin materials, it is harder to perform correction to obtain a desired diameter.

In a case where the abutment portion and its vicinity subjected to the correction do not have a desired diameter, the sealing ring in the usage state lacks in roundness, whereby a gap is formed between the inner surface of the member constituting the shaft hole and the outer circumferential surface of the sealing ring. In a case where the sealing ring is used in the automatic transmission (AT), the continuously variable transmission (CVT) or the like, a high hydraulic pressure of the operating oil is applied to cause the sealing ring to be pressed against the inner surface of the shaft hole, whereby the gap on the outer circumferential side based on the lack of roundness of the sealing ring will disappear. However, in a case where a low hydraulic pressure or no hydraulic pressure is applied as in the reducer, the sealing ring is less likely to be pressed against the inner surface of the shaft hole, and a gap may be therefore formed on the outer circumferential side of the sealing ring.

Under the circumstances, for a sealing ring used in a low pressure environment as in a reducer of a motor mechanism in an electric vehicle (EV) or a hybrid electric vehicle (HEV), a technique which is capable of suppressing occurrence of a gap between the inner surface of a shaft hole and the outer circumferential surface of the sealing ring based on the lack of roundness of the sealing ring has been required.

An object of the present invention is to solve the problem as described above. Specifically, an object of the present invention is to provide a sealing ring capable of suppressing occurrence of a gap between the inner surface of a shaft hole and the outer circumferential surface of the sealing ring, and a sealed structure including the sealing ring.

SUMMARY

The present invention provides the following (1) to (6).

(1) A sealed structure including:
  a shaft; a member having a shaft hole in which the shaft is to be inserted; and a sealing ring configured to seal a gap between an outer surface of the shaft and an inner surface of the member constituting the shaft hole, wherein:
  the shaft has an annular groove formed at the outer surface and having an axis line as its center, and further has one or more recesses which are provided at a bottom surface of the groove in a circumferential direction, and which are concave in a direction approaching the axis line,
  the sealing ring has one or more protrusions protruding from its inner circumferential surface in the direction approaching the axis line, the protrusions are identical in number to the recesses, a radius at a point of each protrusion closest to the axis line is smaller than a radius at the bottom surface of the groove in the shaft, and the sealing ring is configured so that the protrusions are accommodated in the recesses when the sealing ring is set within the groove,
  the sealing ring is configured so that, when the shaft is rotated, an end surface X of each protrusion in the circumferential direction and an end surface Y of each recess in the circumferential direction come into contact with each other to push out the sealing ring on an external diameter side, and
  in a cross-section in a direction perpendicular to the axis line, end surfaces X and end surfaces Y each form a straight line, and an angle $\alpha$ of the straight line representing each end surface X with respect to a radial direction of the sealing ring and an angle $\delta$ of the straight line representing each end surface Y with respect to a radial direction of the shaft are both 45° or more.

(2) The sealed structure according to (1) above, wherein:
  the sealing ring has an abutment portion, and
  in the cross-section in the direction perpendicular to the axis line, a center $X_c$ of an end surface X in the circumferential direction is present within a range of 20° to 60° with respect to the abutment portion.

(3) The sealed structure according to (1) or (2) above, wherein:

two or more protrusions and two or more recesses are present, and in the cross-section in the direction perpendicular to the axis line, the two or more protrusions and the two or more recesses are present at symmetric positions with respect to the abutment portion.

(4) A sealing ring configured to seal a gap between an outer surface of a shaft and an inner surface of a member constituting a shaft hole, the sealing ring being used in a sealed structure including: the shaft; and the member having the shaft hole in which the shaft is to be inserted, the shaft having an annular groove which is formed at the outer surface and has an axis line as its center, and further having one or more recesses which are provided at a bottom surface of the groove in a circumferential direction, and which are concave in a direction approaching the axis line, end surfaces Y of the recesses in the circumferential direction form a straight line, respectively, in a cross-section in a direction perpendicular to the axis line, and an angle δ of the straight line with respect to a radial direction of the shaft being 45° or more, wherein:

the sealing ring has one or more protrusions protruding from its inner circumferential surface in the direction approaching the axis line, the protrusions are identical in number to the recesses, a radius at a point of each protrusion closest to the axis line is smaller than a radius at the bottom surface of the groove in the shaft, and the sealing ring is configured so that the protrusions are accommodated in the recesses when the sealing ring is set within the groove, the sealing ring is configured so that, when the shaft is rotated, an end surface Y and an end surface X of each protrusion in the circumferential direction come into contact with each other to push out the sealing ring on an external diameter side, and in the cross-section in the direction perpendicular to the axis line, each end surface X forms a straight line, and an angle α of the straight line with respect to a radial direction is 45° or more.

(5) The sealing ring according to (4) above, wherein:

the sealing ring has an abutment portion, and in the cross-section in the direction perpendicular to the axis line, a center $X_c$ of an end surface X in the circumferential direction is present within a range of 20° to 60° with respect to the abutment portion.

(6) The sealing ring according to (4) or (5) above, wherein:

two or more protrusions are present, and in the cross-section in the direction perpendicular to the axis line, the two or more protrusions are present at symmetric positions with respect to the abutment portion.

Advantageous Effect of the Invention

The present invention can provide a sealing ring capable of suppressing occurrence of a gap between the inner surface of a shaft hole and the outer circumferential surface of the sealing ring, and a sealed structure including the sealing ring.

BRIEF DESCRIPTION OF THE DRAWINGS

FIG. 1 is a schematic cross-sectional view of a sealed structure of the invention in a direction perpendicular to an axis line L.

FIG. 2 is a schematic cross-sectional view of the sealed structure of the invention in a direction parallel to the axis line L, and is a cross-sectional view (schematic cross-sectional view) taken along line A-A shown in FIG. 1.

FIG. 3 is a schematic view showing a lateral surface of a sealing ring.

FIG. 4 is a partially enlarged perspective view (schematic view) in which the vicinity of a protrusion of the sealing ring shown in FIG. 3 is enlarged.

FIG. 5 is a partially enlarged perspective view (schematic view) in which the vicinity of an abutment portion of the sealing ring shown in FIG. 3 is enlarged.

FIG. 6 is a schematic cross-sectional view showing cross-sections of a shaft included in the sealed structure of the invention and a shaft hole in which the shaft is inserted.

FIG. 7 is a partial cross-sectional view showing in an enlarged scale the vicinities of the protrusion and a recess of the sealed structure.

FIG. 8 is a partial cross-sectional view showing in an enlarged scale the vicinities of the protrusion and the recess of the sealed structure, and showing a state in which the protrusion and the recess are in contact with each other.

FIG. 9 is another partial cross-sectional view showing in an enlarged scale the vicinities of the protrusion and the recess of the sealed structure and showing a state in which the protrusion and the recess are in contact with each other.

FIG. 10 is a graph showing the results of Experiment 1.

FIG. 11 is a graph showing the results of Experiment 2.

DETAILED DESCRIPTION

The present invention is now described.

The present invention provides a sealed structure including: a shaft; a member having a shaft hole in which the shaft is to be inserted; and a sealing ring configured to seal a gap between an outer surface of the shaft and an inner surface of the member constituting the shaft hole, wherein: the shaft has an annular groove formed at the outer surface and having an axis line as its center, and further has one or more recesses which are provided at a bottom surface of the groove in a circumferential direction, and which are concave in a direction approaching the axis line, the sealing ring has one or more protrusions protruding from its inner circumferential surface in the direction approaching the axis line, the protrusions are identical in number to the recesses, a radius at a point of each protrusion closest to the axis line is smaller than a radius at the bottom surface of the groove in the shaft, and the sealing ring is configured so that the protrusions are accommodated in the recesses when the sealing ring is set within the groove, the sealing ring is configured so that, when the shaft is rotated, an end surface X of each protrusion in the circumferential direction and an end surface Y of each recess in the circumferential direction come into contact with each other to push out the sealing ring on an external diameter side, and in a cross-section in a direction perpendicular to the axis line, end surfaces X and end surfaces Y each form a straight line, and an angle α of the straight line representing each end surface X with respect to a radial direction of the sealing ring and an angle δ of the straight line representing each end surface Y with respect to a radial direction of the shaft are both 45° or more.

Such a sealed structure is hereinafter referred to also as the "sealed structure of the invention."

The present invention also provides a sealing ring configured to seal a gap between an outer surface of a shaft and an inner surface of a member constituting a shaft hole, the sealing ring being used in a sealed structure including: the shaft; and the member having the shaft hole in which the shaft is to be inserted, the shaft having an annular groove which is formed at the outer surface and has an axis line as its center, and further having one or more recesses which are provided at a bottom surface of the groove in a circumferential direction, and which are concave in a direction approaching the axis line, end surfaces Y of the recesses in the circumferential direction form a straight line, respectively, in a cross-section in a direction perpendicular to the axis line, and an angle δ of the straight line with respect to a radial direction of the shaft being 45° or more, wherein: the sealing ring has one or more protrusions protruding from its inner circumferential surface in the direction approaching the axis line, the protrusions are identical in number to the recesses, a radius at a point of each protrusion closest to the axis line is smaller than a radius at the bottom surface of the groove in the shaft, and the sealing ring is configured so that the protrusions are accommodated in the recesses when the sealing ring is set within the groove, the sealing ring is configured so that, when the shaft is rotated, an end surface Y and an end surface X of each protrusion in the circumferential direction come into contact with each other to push out the sealing ring on an external diameter side, and in the cross-section in the direction perpendicular to the axis line, each end surface X forms a straight line, and an angle α of the straight line with respect to a radial direction is 45° or more.

Such a sealing ring is hereinafter referred to also as the "sealing ring of the invention."

The sealed structure of the invention includes the sealing ring of the invention.

The sealed structure of the invention and the sealing ring of the invention are described below with reference to the drawings.

The sealed structure of the invention and the sealing ring of the invention which are shown in the following drawings merely illustrate preferred embodiments, and the sealed structure of the invention and the sealing ring of the invention are not limited to the embodiments shown in the drawings.

FIG. 1 is a schematic cross-sectional view of a sealed structure of the invention in a direction perpendicular to an axis line L. FIG. 2 is a schematic cross-sectional view of the sealed structure of the invention in a direction parallel to the axis line L, and is a cross-sectional view taken along line A-A shown in FIG. 1. FIG. 3 is a schematic view showing a lateral surface of a sealing ring. FIG. 4 is a partially enlarged perspective view (schematic view) in which the vicinity of a protrusion of the sealing ring is enlarged. FIG. 5 is a partially enlarged perspective view (schematic view) in which the vicinity of an abutment portion of the sealing ring is enlarged. FIG. 6 is a schematic cross-sectional view showing cross-sections of a shaft included in the sealed structure of the invention and a shaft hole in which the shaft is inserted.

FIG. 1 to FIG. 5 show the state in which no external force is applied to the sealing ring (the state in which the sealing ring is accommodated in a groove, the shaft is not rotated, protrusions 4 of the sealing ring do not get stranded on end surfaces Y of recesses 3, and the pressure of an object to be sealed (oil) does not act on the sealing ring). A sealing ring 2' shown by a dotted line in FIG. 2 shows the state in which an external force is applied to move to this line.

In FIG. 1 and FIG. 2, a sealed structure 1 of the invention includes a shaft 50, a member R having a shaft hole 61 in which the shaft 50 is to be inserted, and a sealing ring 2 configured to seal a gap S between an outer surface 50a of the shaft 50 and an inner surface 62 of the member R constituting the shaft hole 61.

The shaft hole 61 is formed in the member R which is at least a part of a reducer or the like included in a vehicle or a general-purpose machine. In a preferred embodiment shown in FIG. 1 and FIG. 2, the shaft hole 61 is formed in a housing 60 included in the member R which is at least a part of the reducer or the like. Then, the shaft 50 is inserted in the shaft hole 61 and can rotate about the axis line L relatively with respect to the shaft hole 61.

For example, the sealed structure 1 can constitute at least a part of a reducer of a motor mechanism in an EV or an HEV, or an AT or a CTV. The sealed structure 1 preferably constitutes at least a part of a reducer of a motor mechanism or the like in which the internal hydraulic pressure is low.

The sealing ring is now described.

In FIG. 1 and FIG. 2, the sealing ring 2 (the preferred embodiment of the sealing ring of the invention) constitutes a part of the sealed structure 1 of the invention.

The sealing ring 2 has a main body part 20. As shown in FIG. 1 to FIG. 5, a portion (ring portion) which extends annularly around the axis line L when the sealing ring 2 is set in a groove 51 of the shaft 50 is the main body part 20. In the preferred embodiment shown in FIG. 1 to FIG. 5, the cross-sectional shape of the main body part 20 in a direction parallel to the axis line L is rectangular but may be approximately rectangular or elliptical.

In the state in which the sealing ring 2 is set in the groove 51 of the shaft 50, an inner surface close to the axis line L in the main body part 20 is called an inner circumferential surface 21, and an outer surface opposite thereto is called an outer circumferential surface 22 in the main body part 20. Two opposite surfaces in the direction parallel to the axis line L which connect the above surfaces to each other are called a lateral surface 23 and a lateral surface 24 in the main body part 20, respectively.

In the preferred embodiment shown in FIG. 1 to FIG. 5, each of the inner circumferential surface 21 and the outer circumferential surface 22 is a cylindrical or approximately cylindrical surface having the axis line L as its center or approximate center, and the lateral surfaces 23 and 24 are annular planes in a direction perpendicular to the axis line L.

In the preferred embodiment shown in FIG. 1 to FIG. 5, the sealing ring 2 is not endless. That is, the sealing ring is cut at one point in its circumferential direction, and as shown in FIGS. 1, 3 and 5, an abutment portion 5 is formed at the cut part.

The abutment portion 5 has a known structure which is capable of maintaining stable sealing performance even when the circumferential length of the sealing ring 2 is changed by thermal expansion or thermal contraction of the sealing ring 2. Examples of the structure of the abutment portion 5 include a so-called special step-cut structure in which, as shown in FIG. 5, cutting is made in a stepped shape when viewed from each of the sides of the outer circumferential surface 22 and the lateral surfaces 23 and 24, a straight-cut structure, a bias-cut structure, and a step-cut structure.

The sealing ring 2 has, as shown in FIG. 1 to FIG. 4, the protrusions 4 which protrude in a direction approaching the axis line L from the inner circumferential surface 21 of the main body part 20.

The number of the protrusions 4 is equal to the number of the recesses 3 formed in the shaft 50.

As shown in FIGS. 1, 3 and 4, the protrusions 4 are present so as to extend in a circumferential direction on the inner circumferential surface 21 of the main body part 20. Both end surfaces of each protrusion 4 in the circumferential direction are called end surfaces X.

In a cross-section in a direction perpendicular to the axis line L as shown in FIG. 1 and FIG. 3, each of the end surfaces X in the protrusions 4 forms a straight line. The straight line as used herein should encompass not only a complete straight line but also an approximately straight line (a curved line close to the straight line and the like).

Then, as shown in FIG. 3, in the cross-section in the direction perpendicular to the axis line L, the straight line at each end surface X forms an angle $\alpha$ of 45° or more, and preferably 60° to 70° with respect to a radial direction of the sealing ring 2. In the cross-section in the direction perpendicular to the axis line L as shown in FIG. 3, when the center point of an end surface X in the circumferential direction is denoted by a center $X_c$ and a straight line formed by connecting the center $X_c$ and a point indicating the axis line L (the "point indicating the axis line L" in the cross-section in the direction perpendicular to the axis line L is hereinafter also referred to simply as the "axis line L") is denoted by a line d, the angle $\alpha$ is an angle formed by the straight line representing the end surface X and the line d (an angle of 90° or less).

In a case where the end surface X forms not a complete straight line (but a curved line close to the straight line, for example) in the cross-section in the direction perpendicular to the axis line L as shown in FIG. 1 and FIG. 3, an average value of angles formed between tangent lines to the line representing the end surface X and the line d in the cross-section in the direction perpendicular to the axis line L as shown in FIG. 1 and FIG. 3 (an angle of 90° or less) is taken as the angle $\alpha$.

The surface which connects the two end surfaces X in the protrusion 4 and which is the inner circumferential side surface closest to the axis line L is called a locking surface 43. The locking surface 43 may be flat or curved. In the cross-section in the direction perpendicular to the axis line L as shown in FIG. 1 and FIG. 3, the locking surface 43 is preferably a curved surface that forms a part (an arc) of a circle having the axis line L as its center.

The degree to which the protrusion 4 extends in the circumferential direction on the inner circumferential surface 21 of the sealing ring 2 (width of the protrusion 4) should be defined by an angle $\gamma$ in the cross-section in the direction perpendicular to the axis line L as shown in FIG. 1.

The angle $\gamma$ is, as shown in FIG. 1, an angle formed by the two lines d, each line connecting the center $X_c$ of each of the two end surfaces X in the circumferential direction and the axis line L.

The angle $\gamma$ is preferably 5° to 15°.

The degree to which the protrusion 4 protrudes in the direction approaching the axis line L from the inner circumferential surface 21 of the sealing ring 2 (thickness of the protrusion 4) is recognized as the difference between the radius $m_1$ at the inner circumferential surface 21 of the main body part 20 and the radius $m_2$ at the locking surface 43 in the cross-section in the direction perpendicular to the axis line L as shown in FIG. 1 and FIG. 3.

In a case where the locking surface 43 is a curved surface that forms a part (an arc) of a circle having the axis line L as its center in the cross-section in the direction perpendicular to the axis line L as shown in FIG. 1 and FIG. 3, the radius $m_2$ at the locking surface 43 is determined unambiguously. In a case where the locking surface is not such a curved surface, however, the radius $m_2$ should refer to a radius measured at a point of the locking surface 43 closest to the axis line L.

The thickness of the protrusion 4 ($m_1$-$m_2$) is preferably 1 mm or more, and more preferably 1 mm to 3 mm.

The thickness of the protrusion 4 is, as shown in FIG. 2, larger than the radial length (width) between the outer surface 50a of the shaft 50 and the inner surface 62 of the member R constituting the shaft hole 61.

There is no particular limitation on the position of the protrusion 4 on the inner circumferential surface 21 of the sealing ring 2. However, in the cross-section in the direction perpendicular to the axis line L as shown in FIG. 1 and FIG. 3, the center $X_c$ of the end surface X in the circumferential direction is preferably present within the range of 20° to 60° with respect to the abutment portion 5.

Specifically, in the cross-section in the direction perpendicular to the axis line L of the sealed structure of the invention as shown in FIG. 1, a line connecting the center of an inner circumferential side recess 5a of the abutment portion 5 in the circumferential direction and the axis line L is called a reference line K, and when a protrusion 4 which is present at a position closest to the reference line K in the circumferential direction is specified, a protrusion 4 in which the angle of the line d with respect to the reference line K (angle $\beta$) is 20° to 60° is preferably present, the line d being formed by connecting the axis line L and the center $X_c$ of an end surface X of the two end surfaces X of the protrusion 4 on the side closer to the reference line K in the circumferential direction.

In a case where the abutment portion 5 has two or more recesses on the inner circumferential side as shown in FIG. 5, the reference line K should be determined based on a recess of the two or more recesses on the inner circumferential side of the abutment portion 5 which is present on the outermost side of the abutment portion 5 in the circumferential direction. For example, in the embodiment shown in FIG. 5, the abutment portion 5 has two recesses formed on the inner circumferential side. Of the two recesses on the inner circumferential side of the abutment portion 5, the recess which is present on the left side (recess 5a) is present further outside in the circumferential direction (compared to the recess which is present near the center of the abutment portion 5 in the circumferential direction), and the reference line K is therefore determined based on this recess.

The sealing ring 2 preferably has two or more protrusions 4, and in the cross-section in the direction perpendicular to the axis line L as shown in FIG. 1 and FIG. 3, the protrusions 4 are preferably present at symmetric positions with respect to the abutment portion 5.

That is, as shown in FIG. 1 and FIG. 3, when a protrusion 4 which is present at the position closest to the reference line K in the circumferential direction is specified, another protrusion 4 is preferably present at a position symmetric to the specified protrusion 4 with respect to the reference line K (the reference line K is the axis of symmetry).

The thickness of the protrusion 4 in the sealing ring 2 is, as shown in FIG. 2 and FIG. 4, smaller than that of the main body part 20 in the direction parallel to the axis line L.

Therefore, lateral surfaces 44 and 45 of the protrusion 4 extending in the direction perpendicular to the axis line L are not flush with the lateral surfaces 23 and 24 of the main body part 20, respectively, but are stepped. However, the lateral surfaces 44 and 45 of the protrusion 4 may be flush with the lateral surfaces 23 and 24 of the main body part 20, respectively, or one of the lateral surfaces 44 and 45 of the protrusion 4 may be flush with its corresponding one of the lateral surfaces 23 and 24 of the main body part 20.

The radius at a point of the protrusion 4 closest to the axis line L or the radius at the locking surface 43 denoted by $m_2$ in FIG. 1 is smaller than the radius of the shaft 50 at its bottom surface 52 (radius denoted by $m_3$ in FIG. 1).

Then, the sealing ring 2 is configured so that the protrusion 4 is accommodated in the recess 3 when the sealing ring 2 is attached to the groove 51.

The sealing ring 2 can be formed by, for example, injection molding using resin materials such as polyetheretherketone (PEEK), polyphenylene sulfide (PPS), polyetheretherketone (PEEK), polyphenylene sulfide (PPS), and polytetrafluoroethylene (PTFE).

In a case where molding is made by the injection molding, the sealing ring 2 is formed in a state in which the abutment portion 5 is wide, and therefore the molding is followed by a correction (diameter reduction) process of the sealing ring 2 to have a desired diameter.

The shaft is now described.

As shown in FIG. 6, the shaft 50 has the annular groove 51 formed at its outer surface 50a and having the axis line L as its center, and also has one or more recesses 3 which are provided at the bottom surface 52 of the groove 51 in the circumferential direction, and which are concave in the direction approaching the axis line L.

The recess 3 is configured so that the protrusion 4 of the sealing ring 2 is accommodated therein when the sealing ring 2 is attached to the groove 51.

Therefore, as shown in FIG. 1 and FIG. 6, the recess 3 is present so as to extend in the circumferential direction at the bottom surface 52 of the groove 51 in the shaft 50. Both end surfaces of the recess 3 in the circumferential direction are called end surfaces Y.

In the cross-section in the direction perpendicular to the axis line L as shown in FIG. 1 and FIG. 6, each of the end surfaces Y in the recess 3 forms a straight line. The straight line as used herein should encompass not only a complete straight line but also an approximately straight line (a curved line close to the straight line and the like).

Then, as shown in FIG. 6, in the cross-section in the direction perpendicular the axis line L, the straight line at each end surface Y forms an angle δ of 45° or more, and preferably 60° to 70° with respect to a radial direction of the shaft 50. In the cross-section in the direction perpendicular to the axis line L as shown in FIG. 6, when the center point of an end surface Y in the circumferential direction is denoted by a center $Y_c$ and a straight line formed by connecting the center $Y_c$ and the axis line L is denoted by a line e, the angle δ is an angle formed by the straight line representing the end surface Y and the line e (an angle of 90° or less).

The angle δ is preferably within ±3°, more preferably within ±2°, and even more preferably within ±1° with respect to the angle α.

In a case where the end surface Y forms not a straight line (but a curved line close to the straight line, for example) in the cross-section in the direction perpendicular to the axis line L as shown in FIG. 1 and FIG. 6, an average value of angles formed between tangent lines to the line at the end surface Y and the line e in the cross-section in the direction perpendicular to the axis line L as shown in FIG. 1 and FIG. 6 (an angle of 90° or less) is taken as the angle δ.

A surface which connects the two end surfaces Y in the recess 3 and which is the inner circumferential side surface closest to the axis line L is called a locked surface 32. The locked surface 32 may be flat or curved. In the cross-section in the direction perpendicular to the axis line L as shown in FIG. 1 and FIG. 6, the locked surface 32 is preferably a curved surface that forms a part (an arc) of a circle having the axis line L as its center.

The degree to which the recess 3 extends in the circumferential direction at the bottom surface 52 of the groove 51 of the shaft 50 (width of the recess 3) should be defined by an angle ε in the cross-section in the direction perpendicular to the axis line L as shown in FIG. 6.

The angle ε is, as shown in FIG. 6, an angle formed by the two lines e, each line connecting the center $Y_c$ of each of the two end surfaces Y in the circumferential direction and the axis line L.

The angle ε is preferably larger by at least 2° than the angle γ. The angle ε may be larger by up to 10° than the angle γ.

The degree to which the recess 3 is concave in the direction approaching the axis line L from the bottom surface 52 in the groove 51 of the shaft 50 (depth of the recess 3) is recognized as the difference between the radius $m_3$ at the bottom surface 52 and the radius $m_4$ at the locked surface 32 in the cross-section in the direction perpendicular to the axis line L as shown in FIG. 1 and FIG. 6.

In a case where the locked surface 32 is a curved surface that forms a part (an arc) of a circle having the axis line L as its center in the cross-section in the direction perpendicular to the axis line L as shown in FIG. 1 and FIG. 6, the radius $m_4$ at the locked surface 32 is determined unambiguously. In a case where the locked surface is not such a curved surface, however, the radius $m_4$ should refer to a radius measured at a point of the locked surface 32 closest to the axis line L.

The depth of the recess 3 ($m_3$–$m_4$) is preferably larger than the thickness of the protrusion 4 ($m_1$–$m_2$). If this requirement is not met, the shaft 50 may have difficulty in rotating about the axis line L. The depth of the recess 3 ($m_3$–$m_4$) is more preferably larger by 1 mm to 3 mm than the thickness of the protrusion 4 ($m_1$–$m_2$).

The depth of the recess 3 ($m_3$–$m_4$) is preferably 1 mm or more, and more preferably 1 mm to 2 mm.

As described above, the recess 3 is configured so that the protrusion 4 is accommodated therein when the sealing ring 2 is attached to the groove 51. Therefore, the recess 3 is formed at a position where the recess 3 can accommodate the protrusion 4. In other words, in the cross-section in the direction perpendicular to the axis line L as shown in FIG. 1, the position of the recess 3 substantially coincides with that of the protrusion 4.

As described above, in the cross-section in the direction perpendicular to the axis line L as shown in FIG. 1 and FIG. 3, the protrusion 4 is preferably present at the position where the center $X_c$ of the end surface X in the circumferential direction is present within the range of 20° to 60° with respect to the abutment portion 5. Therefore, according to the same thinking, the recess 3 is preferably present at the position where the center $Y_c$ of the end surface Y in the circumferential direction is present within the range of 20° to 60° with respect to the abutment portion 5.

As described above, two or more protrusions 4 are preferably present at symmetric positions with respect to the abutment portion 5 in the cross-section in the direction perpendicular to the axis line L as shown in FIG. 1 and FIG. 3. Therefore, according to the same thinking, two or more recesses 3 are preferably present at symmetric positions with respect to the abutment portion 5.

The width of the recess 3 in the direction parallel to the axis line L is, as shown in FIG. 2, equal to or larger than that of the protrusion 4 in the direction parallel to the axis line L. As shown in FIG. 2, the width of the recess 3 in the direction parallel to the axis line L is equal to that of the bottom surface 52 of the groove 51 in the direction parallel to the axis line L, and lateral surfaces 34 and 35 of the recess 3 in the direction perpendicular to the axis line L are flush with lateral surfaces 53 and 54 of the groove 51, respectively. The width of the recess 3 in the direction parallel to the axis line L may be smaller than that of the bottom surface 52 of the groove 51 in the direction parallel to the axis line L. Alternatively, steps may be formed between the lateral surfaces 34, 35 and their corresponding lateral surfaces 53, 54. Still alternatively, the lateral surface 34 of the recess 3 and the lateral surface 53 of the groove 51 or the lateral surface 35 of the recess 3 and the lateral surface 54 of the groove 51 may be flush with each other, and the non-flush side may have a step formed therebetween.

The sealed structure of the invention as described above is configured so that, when the shaft 50 is rotated about the axis line L, an end surface Y of the recess 3 in the circumferential direction and an end surface X of the protrusion 4 in the circumferential direction come into contact with each other to push out the sealing ring 2 on the outer circumferential side.

This will be described with reference to FIG. 7 to FIG. 9.

FIG. 7 is a partial cross-sectional view showing in an enlarged scale the vicinities of the protrusion 4 of the sealing ring 2 and the recess 3 of the shaft 50 in the sealed structure 1 of the invention shown in FIG. 1.

As described above, in the state in which the sealing ring 2 is attached to the groove 51 of the shaft 50 and the protrusion 4 is accommodated in the recess 3, the sealed structure 1 may have a gap between the locking surface 43 of the protrusion 4 and the locked surface 32 of the recess 3. In a case where the sealing ring 2 lacks in roundness, a portion of the outer circumferential surface 22 of the sealing ring 2 near the abutment portion 5 may not come into contact with the inner circumferential surface 62 of the shaft hole 61 to cause a tiny gap S at this portion between the outer circumferential surface 22 of the sealing ring 2 and the inner circumferential surface 62 of the shaft hole 61.

The outer circumferential surface 22 of the sealing ring 2 and the inner circumferential surface 62 of the shaft hole 61 are partially in contact with each other. Therefore, when a reducer R is used to rotate the shaft 50, for example, frictional force between the outer circumferential surface 22 and the inner circumferential surface 62 causes the sealing ring 2 to relatively rotate with respect to the shaft 50.

This rotation causes the sealing ring to move in a direction in which one end surface X of the protrusion 4 of the sealing ring 2 and one end surface Y of the recess 3 of the shaft 50 approach each other. At the same time, the other end surface X of the protrusion 4 moves away from the other end surface Y of the recess 3. When the one end surface X and the one end surface Y come into contact with each other, the sealing ring 2 does not relatively rotate any more with respect to the shaft 50.

As shown in FIG. 8, the one end surface X of the protrusion 4 and the one end surface Y of the recess 3 come into contact with each other, and then, the whole of the sealing ring 2 is pushed out toward the external diameter side to move toward the external diameter side. Therefore, the gap S between the outer circumferential surface 22 of the sealing ring 2 and the inner circumferential surface 62 of the shaft hole 61 is reduced.

As a result, as shown in FIG. 9, the gap S between the outer circumferential surface 22 of the sealing ring 2 and the inner circumferential surface 62 of the shaft hole 61 disappears, and leakage of oil within the reducer and penetration of foreign matter from outside into the reducer that may be caused by the presence of the gap S are prevented. Disappearance of such a gap S takes place even under the environment of no pressure or low pressure as described above. That is, the disappearance takes place regardless of the magnitude of the hydraulic pressure applied to the sealing ring 2.

EXAMPLES

Experiment 1

Four types of sealed structures which were the sealed structures according to the embodiment shown in FIG. 1 to FIG. 9, and in which the angle $\alpha$ of each end surface X in the protrusions in the circumferential direction with respect to the radial direction was equal to the angle $\delta$ of each end surface Y in the recesses in the circumferential direction with respect to the radial direction in the cross-section in the direction perpendicular to the axis line, both the angles were 30°, 45°, 60° or 78°, and the other conditions were the same were prepared. In the cross-section in the direction perpendicular to the axis line, the end surfaces X and the end surfaces Y each formed a straight line.

Each of the sealed structures was subjected to an experiment under the following conditions to measure the gap (S: outer circumferential gap) between the outer circumferential surface of the sealing ring and the inner circumferential surface of the shaft hole. The measurement results are shown in FIG. 10. This gap means a maximum value in the radial direction.

Experimental Conditions

Internal diameter (nominal diameter) of the shaft hole: Φ99.7 mm

Pressure: not applied

Torque: corresponding to 10 kPa+centrifugal hydraulic pressure

Ambient temperature when measuring the outer circumferential gap S: 25° C.

Material: PEEK

Position of the protrusions (angle $\beta$): 32.5°

Thickness of the protrusions: 1 mm

Width of the protrusions (angle $\gamma$): 15°

Simulation results using analysis software (Marc available from MSC Software Corporation) for FEM (finite element method) analysis were also shown in FIG. 10. In addition to the above four types, simulation was also performed for the case where there was no protrusion.

As shown in FIG. 10, the simulation results were similar to the measurement results.

As shown in FIG. 10, it could be confirmed that the outer circumferential gap was reduced when the angle $\alpha$ was 45° or more. It could be also confirmed that the outer circumferential gap was particularly reduced (specifically, the outer circumferential gap had a maximum value of 0.01 mm or less) when the angle α was 50° or more (preferably 60° or more).

The angle α is preferably 80° or less.

Experiment 2

Two types of sealed structures which were the sealed structures according to the embodiment shown in FIG. 1 to FIG. 9, and in which the center ($X_c$) of the end surface X in the circumferential direction was present at a position based on the abutment portion in the cross-section in the direction perpendicular to the axis line, or at a position indicating the angle β of 32° or 60°, and the other conditions were the same were prepared. In the cross-section in the direction perpendicular to the axis line, the end surfaces X and the end surfaces Y each formed a straight line, and the angle α of each end surface X with respect to the radial direction was set to be equal to the angle δ of each end surface Y with respect to the radial direction.

Each of the sealed structures was subjected to an experiment under the following conditions to measure the gap (S: outer circumferential gap) between the outer circumferential surface of the sealing ring and the inner circumferential surface of the shaft hole. The measurement results are shown in FIG. 11. This gap means a maximum value in the radial direction.

Experimental Conditions

Internal diameter (nominal diameter) of the shaft hole: Φ99.7 mm
Pressure: not applied
Torque: corresponding to 10 kPa+centrifugal hydraulic pressure
Temperature: 25° C.
Material: PEEK
Angle α: 45°
Angle δ: 45°
Thickness of the protrusions: 1 mm
Width of the protrusions (angle γ): 15°

Simulation results using the same analysis software as in Experiment 1 were also shown in FIG. 11. Simulation was performed for the cases of 12°, 22°, 32°, 42°, 52°, 62°, 72°, and 82° based on the abutment portion in the cross-section in the direction perpendicular to the axis line. Simulation was also performed for the case where there was no protrusion.

As shown in FIG. 11, the simulation results had the same tendency as the measurement results.

As shown in FIG. 11, it could be confirmed that the outer circumferential gap was reduced (specifically, the outer circumferential gap had a maximum value of 0.01 mm or less) when the center of the end surface X in the circumferential direction was present at a position of 20° to 60° (in particular about) 30° based on the abutment portion in the cross-section in the direction perpendicular to the axis line.

The invention claimed is:

1. A sealed structure comprising: a shaft;
a member having a shaft hole in which the shaft is to be inserted; and a sealing ring configured to seal a gap between an outer surface of the shaft and an inner surface of the member constituting the shaft hole, wherein: the shaft has an annular groove formed at the outer surface and having an axis line as its center, and further has one or more recesses which are provided at a bottom surface of the groove in a circumferential direction, and which are concave in a direction approaching the axis line, the sealing ring has one or more protrusions protruding from its inner circumferential surface in the direction approaching the axis line, the protrusions are identical in number to the recesses, a radius at a point of each protrusion closest to the axis line is smaller than a radius at the bottom surface of the groove in the shaft, and the sealing ring is configured so that the protrusions are accommodated in the recesses when the sealing ring is set within the groove, the sealing ring is configured so that, when the shaft is rotated, an end surface X of each protrusion in the circumferential direction and an end surface Y of each recess in the circumferential direction come into contact with each other and the end surface X of each protrusion slides along the end surface Y of each recess in a radially outward and circumferential direction to push out the sealing ring on an external diameter side, and in a cross-section in a direction perpendicular to the axis line, end surfaces X and end surfaces Y each form a straight line, and an angle a of the straight line representing each end surface X with respect to a radial direction of the sealing ring and an angle 5 of the straight line representing each end surface Y with respect to a radial direction of the shaft are between 60 degrees and 80 degrees.

2. The sealed structure according to claim 1, wherein: the sealing ring has an abutment portion, and in the cross-section in the direction perpendicular to the axis line, a center $X_c$ of an end surface X in the circumferential direction is present within a range of 20° to 60° with respect to the abutment portion.

3. The sealed structure according to claim 1, wherein: two or more protrusions and two or more recesses are present, and in the cross-section in the direction perpendicular to the axis line, the two or more protrusions and the two or more recesses are present at symmetric positions with respect to the abutment portion.

4. A sealing ring configured to seal a gap between an outer surface of a shaft and an inner surface of a member constituting a shaft hole, the sealing ring being used in a sealed structure comprising: the shaft; and the member having the shaft hole in which the shaft is to be inserted, the shaft having an annular groove which is formed at the outer surface and has an axis line as its center, and further having one or more recesses which are provided at a bottom surface of the groove in a circumferential direction, and which are concave in a direction approaching the axis line, end surfaces Y of the recesses in the circumferential direction form a straight line, respectively, in a cross-section in a direction perpendicular to the axis line, and an angle delta of the straight line with respect to a radial direction of the shaft being between 45 degrees and 80 degrees wherein: the sealing ring has one or more protrusions protruding from its inner circumferential surface in the direction approaching the axis line, the protrusions are identical in number to the recesses, a radius at a point of each protrusion closest to the axis line is smaller than a radius at the bottom surface of the groove in the shaft, and the sealing ring is configured so that the protrusions are accommodated in the recesses when the sealing ring is set within the groove, the sealing ring is configured so that, when the shaft is rotated, an end surface Y and an end surface X of each protrusion in the circumferential direction come into contact with each other and the end surface X of each protrusion slides along the end surface Y of each recess in a radially outward and circumferential direction to push out the sealing ring on an external diameter side, and in the cross-section in the direction perpendicular to the axis line, each end surface X forms a straight line, and an angle a of the straight line with respect to a radial direction is between 60 degrees and 80 degrees.

5. The sealing ring according to claim 4, wherein:

the sealing ring has an abutment portion, and in the cross-section in the direction perpendicular to the axis line, a center $X_c$ of an end surface X in the circumferential direction is present within a range of 20° to 60° with respect to the abutment portion.

6. The sealing ring according to claim 4, wherein:

two or more protrusions are present, and in the cross-section in the direction perpendicular to the axis line, the two or more protrusions are present at symmetric positions with respect to the abutment portion.

\* \* \* \* \*